U.S. Patent  Feb. 10, 1976  3,936,935
FIG.1
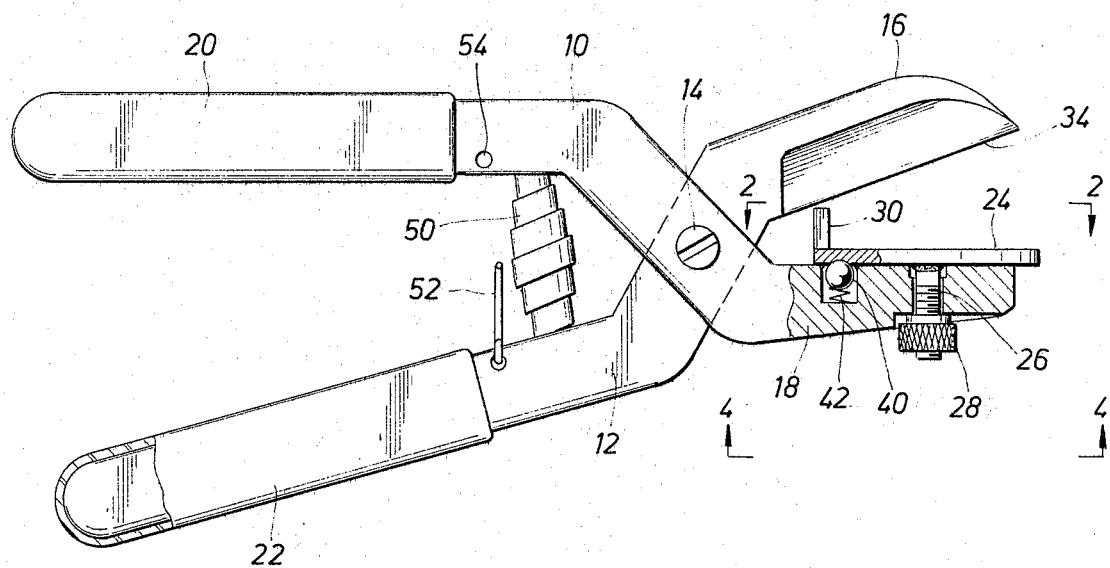
FIG.2
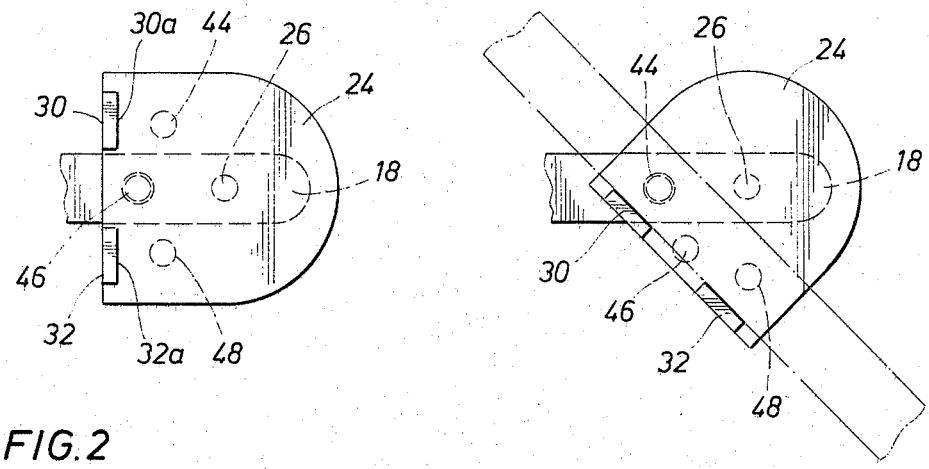
FIG.3
FIG.4
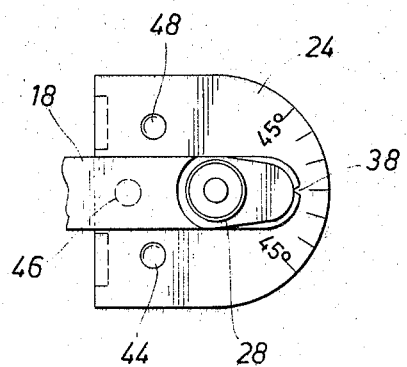

MITERING APPARATUS

This invention relates to apparatus for cutting elongated material, such as molding, at different angles to its longitudinal axis as desired to form miter joints and the like.

This invention has utility for cutting any elongated material at various angles to its longitudinal axis. It is particularly useful, however, in cutting molding to form miter joints. Traditionally, carpenters have used miter boxes and hand saws to cut molding at the proper angle for miter joints.

It is an object of this invention to provide apparatus for cutting elongated material, such as molding, at one of several selected angles to its longitudinal axis for ease in forming miter joints and the like that is of simple construction, that can be operated easily, and that can be adjusted for different angles of cut quickly and accurately.

It is another object of this invention to provide such apparatus that includes a shear arrangement to cut the material along the desired angle and an indexing type plate movable relative to the cutting edge of the shears to position the material to be cut at the desired angle to its longitudinal axis.

Other objects, advantages, and features of this invention will be apparent to those skilled in the art from a consideration of this specification, including the attached drawings and appended claims.

In the drawings:

FIG. 4 is a view taken along line 4—4 of FIG. 1.

Figure 1:
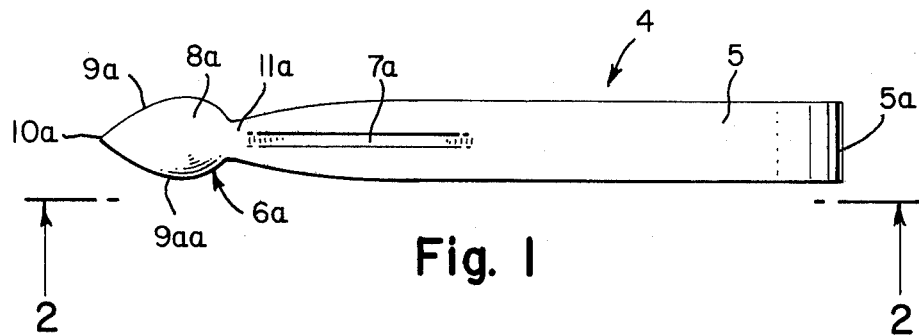
FIG. 1 is a side view, partially in elevation and partially in section, of the preferred embodiment of the apparatus of this invention.

The apparatus includes two members 10 and 12 that are connected together intermediate their ends by pivot pin 14 to provide relative pivotal scissor type movement of the members around the axis of the pin. The portions of the members on the right hand side of the pivot pin, as viewed in FIG. 1, provide jaws 16 and 18. The portions of the members on the left hand side of the pivot pin provide handles 20 and 22 that will move the jaws together when the handles are moved together in the nature of a pair of scissors or shears.

Means are provided for positioning the material to be cut at a selected angle to its longitudinal axis. In the embodiment shown, such means includes base plate 24, which is mounted on jaw 18 of first member 10 for rotation around an axis parallel to the direction of movement of the jaws. As shown, threaded rod or stud 26 extends through an opening in jaw 18 and the longitudinal axis of the stud is parallel to the direction of movement of jaws 16 and 18 as they are moved together by the handles. Nut 28, which may be knurled for ease of operation, can be loosened to allow plate 24 to be rotated around the axis of stud 26 and then tightened to hold the plate in the desired position.

The positioning means includes stop means that is carried by the plate and against which the material is moved to position it relative to the plate for the desired angle of cut. In the embodiment shown, vertical plates or lugs 30 and 32 are attached to plate 24 along one edge. The lugs provide aligned surfaces 30a and 32a against which the material being cut, such as molding, can be positioned to insure that the molding is properly positioned on the plate to obtain the angle of cut desired.

Figure 2:
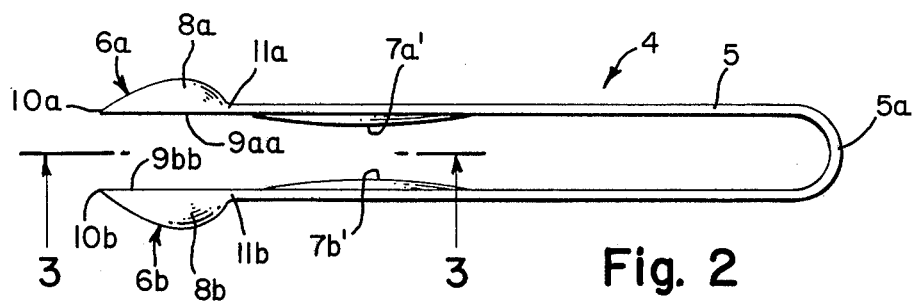
FIG. 2 is a view taken along line 2—2 of FIG. 1 looking down on the indexing or positioning plate of the apparatus.
Figure 3:
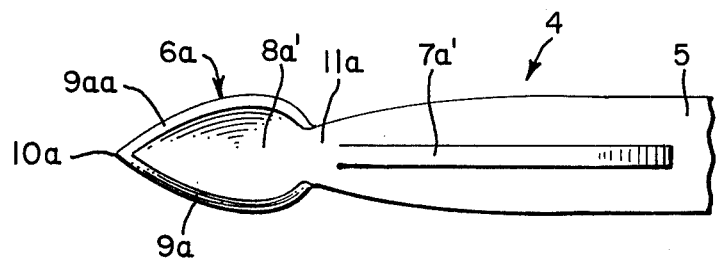
FIG. 3 is a similar view to FIG. 2 showing the indexing plate positioned to cut material at a different angle.

For example, as shown in FIG. 2, plate 24 is positioned so that surfaces 30a and 32a lie in a plane that is transverse the plane in which the jaws move. Thus, an elongated piece of of molding positioned against surfaces 30a and 32a will be cut at an angle of 90° by cutting blade 34 carried by jaw 16 when the two jaws are moved together. Cutting blade 34 can move between stop members 30 and 32 to make the cut in the molding without interference. When it is desired to cut the molding at a different angle, for example, at a 45° angle to its longitudinal axis, nut 28 is loosened and plate 34 is rotated around the axis of stud 26 to the position shown in FIG. 3. The molding, as shown with dashed lines in FIG. 3, can then be positioned against surfaces 30a and 32a and when the cutting edge carried by jaw 16 is moved downwardly, it will cut the molding at a 45° angle to its longitudinal axis.

For convenience in positioning the plate to obtain the desired angle of cut, index 38, comprising a notch, as shown in FIG. 4, along the front edge of jaw 18, combines with the scale, shown in FIG. 4, that is provided on the bottom surface of plate 24 to indicate the angle that plate 34 will cut for a given position of plate 24. In the embodiment shown, a 90° scale is indicated. This, of course, could be enlarged or reduced, as desired.

Since the angles of 90° and 45° will be the most popular and most frequently used angles of cut, it may be convenient to provide detents to indicate when the plate is in one of these positions. As shown in FIG. 1, detent ball 40 and spring 42 are positioned in a hole in jaw 18 so that the spring urges the ball upwardly against the plate. Shallow depressions or cavities 44, 46, and 48 are provided in the lower surface of plate 24 and positioned equidistance from the axis of rotation of the plate so that they will rotate into position to be engaged by ball 40. This will allow an operator knowing by observation that the plate is in, for example, the position shown in FIG. 2, to loosen nut 28 slightly, rotate plate 24 until he hears ball 40 snap into cavity 44, and he knows the plate is in position to cut at a 45° angle. In the same way, he can rotate it back to 90° or to the other 45° position without checking the index.

Spring 50 is positioned between handles 20 and 22 to keep the jaws open so that the operator can conveniently place the material or position the plate, as desired, without having to worry about holding the jaws open. Also, latch 52 is provided so that the two jaws can be moved together and latch 52 moved into engagement with hole 54 in member 10 to hold the jaws together when the tool is to be stored or not used for a period of time.

Also, if desired, plugs 30 and 32 could be positioned with their ends adjacent each other with just enough clearance to allow the passage of cutting edge or blade 34 to provide a guide for the cutting edge if this appears to be desirable. With a 45° angle, of course, the lugs could be provided with appropriate grooves to allow the passage of the cutting edge in the same manner to provide guidance to it.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. Apparatus for cutting elongated material, such as molding, at a selected angle to its longitudinal axis for miter joints and the like, comprising first and second members, means connecting the members intermediate their ends for relative pivotal scissor type movement so that the portions of the members on one side of the connecting means provide jaws and the portions of the members on the other side provide handles for moving the jaws toward and away from each other, a cutting edge carried by the jaw of the second member for cutting the material at the desired angle when the jaws are moved together by the handles to force the cutting edge on the jaw of the second member through the material positioned on the jaw of the first member, means for positioning the material on the jaw of the first member for cutting at a selected angle to its longitudinal axis, said means including a base plate and stop means carried by the base plate to engage the material to be cut and position the material in a preselected position on the base plate, means mounting the base plate between the jaws and on the jaw of the first member for rotation around an axis parallel to the direction of movement of said jaws for locating the stop means to position the material to be cut at the desired angle to the jaws and for holding the base plate in the desired position, said mounting means including a threaded mounting member connected to the base plate and extending through the jaw to allow pivotal movement of the plate around the longitudinal axis of the mounting member and a nut in threaded engagement with the mounting member to engage the lower side of the jaw and clamp the plate in the desired position when rotated in one direction and to move out of engagement with the jaw when rotated in the other direction to allow the plate to be positioned for the stop means to hold the material at the desired angle to be cut, said stop means comprising two spaced stop plates having aligned surfaces to engage the material to be cut, said stop plates being spaced apart and of a length to allow the cutting edge on the jaw of the first member to pass therebetween when the plate is positioned to make a cut of 90° to the longitudinal axis of the material and to allow the cutting blade to clear the stop plates when the plate is positioned to make a cut of 45° to the longitudinal axis of the material.

2. The apparatus of claim 1 in which the base plate is provided with a scale and the jaw upon which it is carried is provided with an index to combine with the scale to indicate the angle of cut for the position of the base plate.

3. The apparatus of claim 2 further provided with means to hold the base plate in the desired position.

4. The apparatus of claim 3 in which the holding means include a detent ball carried by the jaw on which the base plate is mounted, resilient means urging the ball into engagement with the plate, and cavities positioned to be engaged by the ball to releasably hold the plate in selected positions.

* * * * *